(12) United States Patent  
Popper

(10) Patent No.: US 8,890,696 B2
(45) Date of Patent: Nov. 18, 2014

(54) FIRE DETECTOR

(76) Inventor: James Sinclair Popper, Swindon (GB)

(*) Notice: Subject to any disclaimer, the term of this patent is extended or adjusted under 35 U.S.C. 154(b) by 100 days.

(21) Appl. No.: 13/700,920

(22) PCT Filed: May 10, 2011

(86) PCT No.: PCT/GB2011/050893
§ 371 (c)(1),
(2), (4) Date: Feb. 11, 2013

(87) PCT Pub. No.: WO2011/141730
PCT Pub. Date: Nov. 17, 2011

(65) Prior Publication Data
US 2013/0207807 A1  Aug. 15, 2013

(30) Foreign Application Priority Data

May 10, 2010 (GB) .................................. 1007681.8
Apr. 7, 2011 (GB) .................................. 1105889.8

(51) Int. Cl.
*G08B 17/12* (2006.01)
*G01J 1/58* (2006.01)

(52) U.S. Cl.
CPC .. *G01J 1/58* (2013.01); *G08B 17/12* (2013.01)
USPC .......................................... 340/600; 340/578

(58) Field of Classification Search
CPC ..... G08B 17/103; G08B 17/107; G08B 17/12
USPC ....................... 340/600, 577, 578; 250/339.15
See application file for complete search history.

(56) References Cited

U.S. PATENT DOCUMENTS

| 3,940,753 | A | * | 2/1976 | Muller ..................... 250/339.15 |
| 4,803,469 | A | * | 2/1989 | Matsushita .................... 340/577 |
| 5,625,342 | A |   | 4/1997 | Hall et al. |
| 6,545,608 | B1 |   | 4/2003 | Kaufman |
| 6,680,671 | B2 | * | 1/2004 | Okamoto et al. ............. 340/578 |
| 7,155,029 | B2 | * | 12/2006 | King et al. ............... 250/339.15 |
| 7,244,946 | B2 | * | 7/2007 | Burnette et al. ............. 250/372 |

FOREIGN PATENT DOCUMENTS

GB          1353615 A       5/1974

* cited by examiner

*Primary Examiner* — John A Tweel, Jr.
(74) *Attorney, Agent, or Firm* — King & Schickli, PLLC

(57) ABSTRACT

A fire detector includes a sensor (4) for, in use, detecting electromagnetic radiation emitted by a flame and generating an electronic signal corresponding to the detected electromagnetic radiation. The detector further includes a processing device (2) configured to select a portion of the electronic signal corresponding to a first time period and compare the selected signal portion with at least one parameter to determine an initial presence or absence of a flame, the processing device being further configured, upon determining the initial presence of the flame, to select a further portion of the electronic signal corresponding to a further time period and comparing the further selected signal portion with at least one parameter to determine a definite presence or absence of the flame.

29 Claims, 3 Drawing Sheets

FIRE DETECTOR

This application is the national stage of PCT/GB2011/050893, which claims priority from Great Britain Patent Application Serial Numbers 1007681.8 and 1105889.8, the disclosures of which are incorporated herein by reference.

The present invention relates to a fire detector.

FIELD OF THE INVENTION

Background to the Invention

Within the UK, it is widely recognised that there is a considerable threat posed by domestic fires. UK statistics show that the majority of recent fires have originated in kitchens, usually due to cooking being left unattended. This is typically due to the person cooking being distracted by the telephone, doorbell or television.

A problem associated with conventional ionising smoke alarms, which are typically used in the home, is that they cannot function effectively within a kitchen environment. This is because an ionising smoke alarm can be erroneously activated by smoke particles that are associated with everyday cooking. Therefore, if placed in a kitchen or other environment where smoke or steam is present, an ionising smoke alarm can falsely activate, causing nuisance tripping and false alarms. This can happen in many homes on a frequent basis, and can become annoying for the occupants. This may ultimately lead to the occupants disabling the system, meaning that they are no longer protected or alerted to the actual presence of a fire if it occurs.

A possible way to reduce false alarms is to situate the ionising smoke alarm outside the kitchen. However, this would result in the delayed detection of a kitchen fire because the detection unit is not positioned in the same room as the fire itself. This delay results in vital time being lost in the combating of, or escaping from, a fire.

In order to attempt to overcome the problems associated with an ionising smoke alarm, it has been proposed to provide a fire alarm which seeks to detect the presence of a flame by using a sensor sensitive to, for example, infra-red radiation emitted by flames. A known system measures the overall level of infrared in the environment. If this level rises above a normal limit, the system determines that a fire is present and sounds an alert. However, a major problem associated with this method is that it is only suited to environments where the level of infrared and temperature are controlled and there is little variation. The system has to be individually calibrated to this level. This is therefore not suited to a domestic kitchen environment, where the infrared can vary hugely, due to factors such as fluctuating temperature, body heat and direct exposure to sunlight at certain times of the day.

Conventional fire detectors are also unable to differentiate between different fire types. In order to avoid/reduce the risk of false alarms, it is desirable to determine whether the fire has controlled characteristics, namely that the flame is contained and is expected to occur in the normal operation of a product, posing little immediate danger to the occupants of a dwelling, such as a gas hob flame, or it is of an uncontrolled nature, where the flame is uncontained and occurs by accident, exposing occupants to a large degree of danger, such as in the case of a kitchen fire.

SUMMARY OF THE INVENTION

Embodiments of the invention provide an improved fire detector which reduces or substantially obviates the aforementioned problems.

According to one aspect of the present invention there is provided a fire detector including:
a sensor for, in use, detecting electromagnetic radiation emitted by a flame and generating an electronic signal corresponding to the detected electromagnetic radiation; and
a processing device configured to select a portion of the electronic signal corresponding to a first time period and compare the selected signal portion with at least one parameter to determine an initial presence or absence of a flame, the processing device being further configured, upon determining the initial presence of the flame, to select a further portion of the electronic signal corresponding to a further time period and comparing the further selected signal portion with at least one parameter to determine a definite presence or absence of the flame.

The fire detector may further include an alert device configured to output an alert upon receiving a signal from the processing device indicative of determination of the definite presence of the flame.

The processing device may be further configured to analyse the electronic signal to classify the flame as a controlled fire or an uncontrolled fire. The processing device can be configured to analyse a number of oscillations of the selected signal portion at at least one frequency and wherein the at least one parameter corresponds to an oscillation threshold value, the processing device comparing the number of oscillations and the oscillation threshold value to determine the initial presence or absence of the flame. The processing device can be configured to analyse the number of oscillations at 4 Hz and the oscillation threshold value is 35. If the processing device does not determine the initial presence of the flame then it may return to selecting a portion of the electronic signal corresponding to a first time period. The processing device can be configured, upon determining the initial presence of the flame, to analyse the further selected signal portion to assess whether amplitudes of oscillations of the further selected signal portion within a predetermined frequency range are constant or decaying, wherein the flame is classified as an uncontrolled fire if the amplitudes are constant, or the flame is classified as a controlled fire if the amplitudes are decaying. The processing device may be configured, upon determining the initial presence of the flame, to analyse the further selected signal portion to assess whether amplitudes of oscillations of the further selected signal portion within a predetermined frequency range have values that within a predetermined range of ratios, wherein the flame is classified as an uncontrolled fire if the amplitudes are within the range, or the flame is classified as a controlled fire if the amplitudes are not within the range. If the flame is classified as a controlled fire then the processing device can return to selecting a portion of the electronic signal corresponding to a first time period.

The step of assessing whether the amplitudes are constant or decaying (or assessing whether amplitudes of oscillations of the further portion within a predetermined frequency range have values that within a predetermined range of ratios) can include:
calculating a first ratio between amplitudes of oscillations at a first frequency and a second frequency within the predetermined frequency range;
calculating a second ratio between amplitudes of oscillations at the first frequency and a third frequency within the predetermined frequency range;
determining if the first ratio and the second ratio meet criteria indicative of constant or decaying amplitudes.

The first ratio may be indicative of the constant amplitude (and uncontrolled fire) if it is 0.5 and the second ratio can be indicative of the constant amplitude (and uncontrolled fire) if it is 0.175. The processing device can be configured to signal the definite presence of the fire to the alert device only if the processing device determines the presence of the fire multiple times sequentially.

The detector may further include an optical filter device for filtering the radiation sensed by the sensor, the optical filter device being configured to filter out wavelengths outside a pre-determined range of wavelengths.

According to a further aspect of the present invention there is provided a fire detector system including:
- a sensor for, in use, detecting electromagnetic radiation emitted by a flame and generating an electronic signal corresponding to the detected electromagnetic radiation;
- a processing device configured to process at least a portion of the electronic signal to classify the flame as a controlled fire or an uncontrolled fire, and an alert device configured to output an alert upon determination of the uncontrolled fire.

According to yet another aspect of the present invention there is provided a fire detection system comprising a fire detector substantially as described herein, the detector including a communications device for transferring a signal indicative of determination of the definite presence of the flame to a remote device including an alarm.

According to another aspect of the present invention, there is provided a fire detector comprising a sensor for detecting at least one of infra-red and ultraviolet electromagnetic radiation emitted by a flame and generating a variable amplitude electronic signal corresponding to flame flicker and flame intensity, a processing circuit which selects at least a portion of the variable amplitude electronic signal over a predetermined time period and compares the selected signal portion with at least one pre-set parameter to determine the presence or absence of a flame, and an alert which is outputted on determination of the presence of said flame, wherein, to detect the continued presence of a flame, the in use processing circuit after said flame has been detected continues to compare a said selected signal portion of a said variable amplitude electronic signal being outputted by the sensor with the pre-set parameter.

The continued sensing of the detector and comparison of the selected signal portion after a fire has been detected and the alert outputted has the advantage that the alert can be turned off if a flame is no longer detected, without the need for human intervention, for example, if a flame has been extinguished or in the rare event of a false alarm.

An amplifier means may be provided for amplifying the variable amplitude electronic signal and a filter means, for example, a bandpass filter, may be provided for filtering the variable amplitude electronic signal for filtering out frequencies outside a predetermined range of frequencies. The sensor is preferably filtered to a narrow band of infrared wavelengths, thereby offering maximum sensitivity to the detection of possible flames, whilst reducing the background noise that it detects.

In one preferred arrangement, the processing circuit is designed to amplify and bandpass the input signal, then determine the amount of amplitude of oscillations at at least two frequencies and compare both of them with respective pre-set parameters. If the at least two selected signal portions are both within the range of the pre-set parameters, then the processing circuit determines that a fire is present.

In an alternative preferred arrangement, the selected signal portions are voltages emitted when peaks in the oscillation of the variable amplitude electronic signal are detected. If these peaks are detected for longer than a predetermined period of time, then a fire is determined to be present. A peak voltage associated with the selected signal portion can be detected to determine the initial presence of the flame, and the processing device is configured to detect a further peak voltage associated with the further selected signal portion to determine the continued presence of the flame. The processing device may be configured to detect the further peak voltage after a predetermined period of time. The peak voltage associated with the selected signal portion can decay if another peak is not detected within the predetermined period of time.

The preferred processing arrangements are advantageous because they both reduce the likelihood of false alarms and may overcome the previously mentioned problems.

The alert may be a visual or audible alarm, for example, a piezoelectric buzzer.

A temperature sensing means may be provided for monitoring temperature and outputting the alert when the temperature rises above a predetermined temperature value. The temperature sensing means may be a thermistor.

The sensor may have a substantially unidirectional field of view with a sensing arc of up to 90 degrees. Alternatively, the sensing arc may only be up to 45 degrees. The sensor may be a pyroelectric sensor.

Preferably, the detector is powered by an internal battery. This allows maximum versatility when positioning the product, and reduces the inconvenience associated with installation.

Preferably, the detector is contained in one small, low profile case, thereby keeping its size to a minimum for ease of fitting, for example, in the home.

Other preferable and/or optional features of the invention are set forth below.

BRIEF DESCRIPTION OF THE DRAWINGS

For a better understanding of the present invention, and to show more clearly how it may be carried into effect, reference will now be made, by way of example, to the accompanying drawings, in which.

DETAILED DESCRIPTION OF THE DRAWINGS

Figure 1:
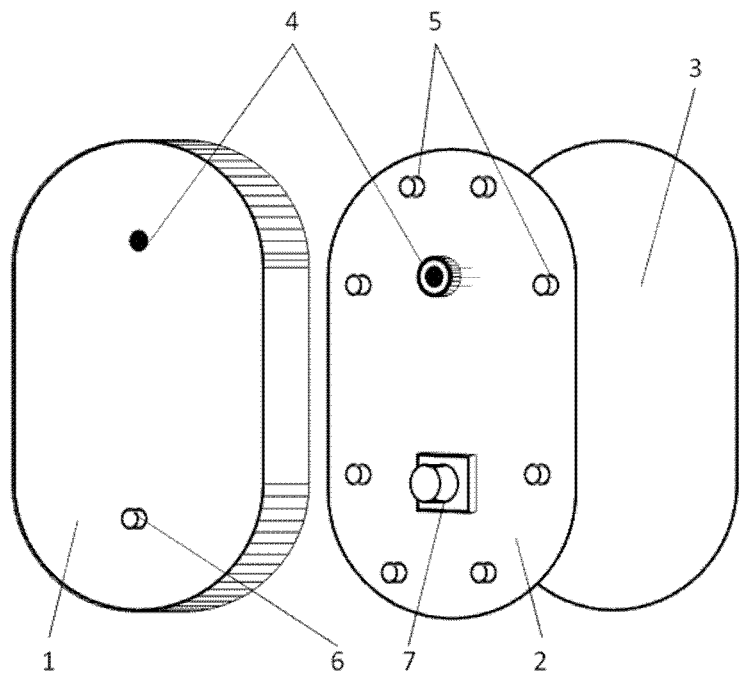
FIG. 1 shows an exploded front perspective view of a fire detector.
Figure 2:
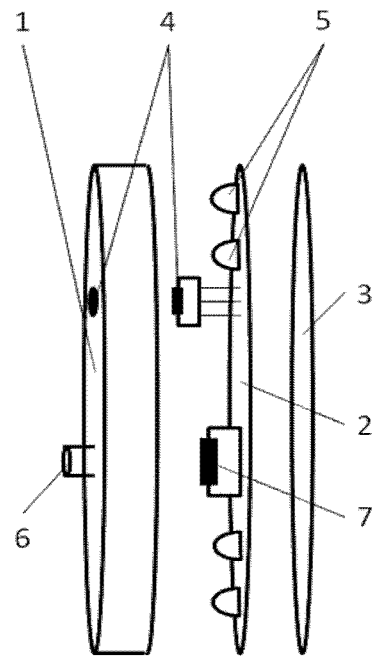
FIG. 2 shows an exploded side view of the fire detector shown in FIG. 1.

Referring to FIGS. 1 and 2, an example fire detector comprises three layered parts. The first part is an outer casing 1 (formed of plastic in the example) within which operative components of the detector are housed. An aperture is provided through the surface of the outer casing 1 for receiving a pyroelectric sensor 4 and a mounting is also provided for a TEST push button 6. The second layered part is a printed circuit board 2 containing the electronics of the detector, including the alarm device. Mounted on the board is the pyroelectric sensor 4, TEST switch 7, LED lights 5, piezoelectric buzzer and battery. The third and final layered part is a plastic backing board 3, which can be used to attach the fire detector to the wall. It will be appreciated that the design of the casing shown is exemplary only and in practice its shape and size can vary.

In use, infrared radiation emitted from a fire is detected by the pyroelectric sensor 4. The sensor 4 produces an electronic signal that varies in amplitude according to the intensity of infrared present within in the operating environment. This amplitude can change very rapidly, causing the electronic signal to oscillate when a flame is present, due to its flickering and the varying light intensity of the flame. The sensor is optically filtered in order to only measure a small band of infrared wavelengths. In an alternative embodiment, the device could instead contain a sensor that is optically filtered and sensitive to ultraviolet light, using the same processing methods as described below to detect the presence of an uncontrolled fire.

Figure 3:
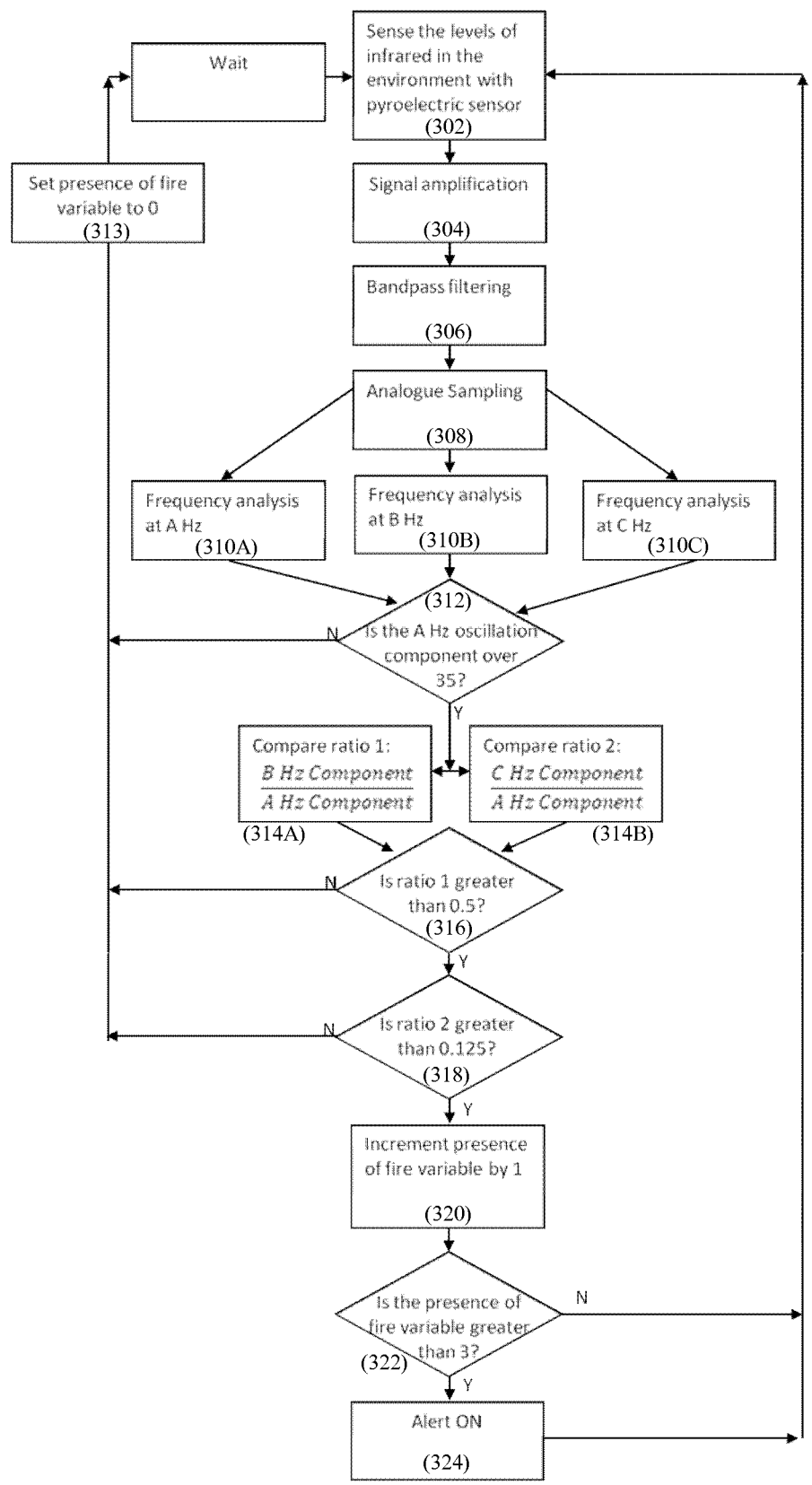
FIG. 3 shows the process of fire detection undertaken by the first embodiment in a flowsheet.

In a first embodiment, the electronic signal is then fed into the circuit, housed on the printed circuit board 2. Operation of the circuit is illustrated in FIG. 3 and at step 302 the levels of infrared are sensed. A signal representing the sensed infrared undergoes a number of modifications, including amplification (step 304) and bandpass frequency filtering (step 306), resulting in a signal that only oscillates within the frequency range that is measured.

The next stage in determining the presence of a flame is to feed the output of the signal modification stages into a microcontroller unit (MCU). The MCU reads the input as an analogue sample (step 308), collecting data points at a specific sampling rate (steps 310A, 310B, 310C). In one example the sampling rate is 512 Hz. The microcontroller then carries out a frequency analysis on the sample to determine whether oscillations indicate the presence of a controlled or uncontrolled fire. A controlled flame is contained and is expected to occur in the normal operation of a product, posing little immediate danger to the occupants of a dwelling, such as a gas hob flame, whereas an uncontrolled flame is uncontained and occurs by accident, exposing occupants to a large degree of danger, such as in the case of a kitchen fire. Generally, a controlled fire has a plentiful supply of oxygen producing a blue coloured flame, whereas an uncontrolled fire has a flame with an orange colour, showing the lack of complete combustion.

The device measures the amplitude of oscillations at values A, B and C Hz. A, B and C typically have unique values in the range 4-15 Hz. The device then analyses (step 312) the amplitude of oscillations at the lowest frequency, A, which would indicate the presence of flame flicker and thus the presence of a flame. In one embodiment, if the amplitude of A measured exceeds 35, the device assumes a flame to be present and thus proceeds with flicker analysis. If not, then the device resets by setting a variable recording the initial presence of a flame to zero (step 313) and control returns to step 302.

Figure 4:
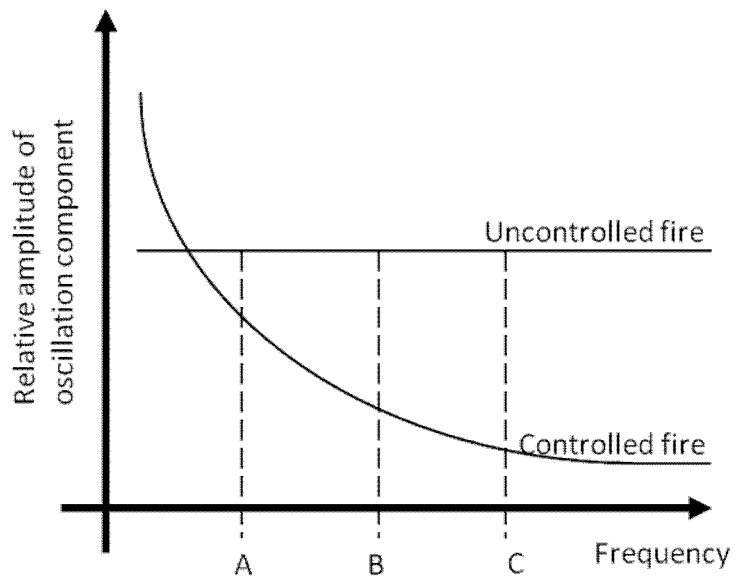
FIG. 4 shows a frequency distribution graph of the flame oscillations in a controlled fire compared to an uncontrolled fire.
Figure 5:
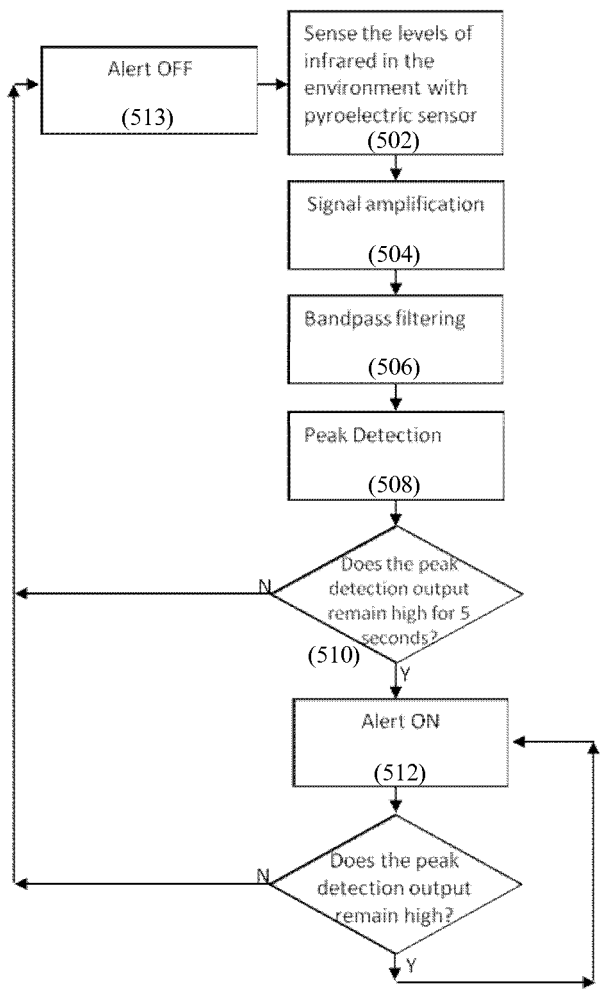
FIG. 5 shows the process of fire detection undertaken by the second embodiment in a flowsheet.

The next stage involves determining whether or not the fire has controlled characteristics, i.e. whether the flame is from a controlled or uncontrolled fire. FIG. 4 shows the expected frequency distribution of the infrared oscillations of uncontrolled compared to controlled fires. This illustrates that within the range A to C Hz, the amplitude of the oscillations remain approximately constant for uncontrolled fires, whereas there is substantial decay of amplitude over this range for controlled fires. In order to measure the differences between the oscillations in controlled and uncontrolled fires, the device calculates the ratio between A and B (step 314A of FIG. 3), as well as between A and C (step 314B). This allows the device to measure the rate of decay of the amplitude of oscillations between A and C. If a significant decay is detected, this indicates the presence of a controlled rather than uncontrolled fire. In one embodiment, an uncontrolled fire is deemed to have a ratio between A and B of 0.5 (tested at step 316), as well as a ratio between A and C of 0.125 (tested at step 318). Any oscillations that do not conform to these criteria are rejected and the process is reset (i.e. control passes step 313 and then returns to step 302).

If the input signal displays both aforementioned characteristics in both the level and ratio of oscillations, it is deemed to be indicative of a dangerous uncontrolled fire. However, to reduce the occurrence of any potential false alarms, the device must detect an uncontrolled fire through this process multiple times consecutively before the alert is activated. In the illustrated embodiment this is done by storing a variable representing the presence of a fire and incrementing it (step 320) every time the tests performed at steps 316 and 318 are positive. If this happens multiple times consecutively (3 times in the example embodiment)—tested at step 322—then the alert device is activated at step 324.

The alert or warning device can comprise an audible alert (e.g. a piezoelectric buzzer alarm) and/or a visual alert (e.g. plurality of LED lights 5), which turn on when the system is activated. Once the alert is activated, the microcontroller will reassess the situation after a pre-determined length of time, carrying out the aforementioned detection process repeatedly thereafter. In the current embodiment this predetermined time period is ten seconds. If the detection process indicates that an uncontrolled fire is no longer present two times consecutively, the alert is silenced, the device resets and normal operation resumes.

In an alternative embodiment, the alert device can be separate from the detector/processing device; for example, in an interlinked system with multiple detection and alert devices controlled centrally. In this case, the processing and alert devices can be linked using a communication device, either wired or wireless.

In another embodiment, the electronic signal from the sensor 4 is treated in a different way. As in the first embodiment, the electronic signal is fed (step 502) into the circuit housed on the printed circuit board 2 and undergoes a number of modifications, including amplification (step 504) and bandpass filtering (step 506). The next stage of signal refinement and modification involves peak detection (step 508). Here, part of the circuit is sent to a high voltage when a peak in the oscillation of the signal is detected. This can be considered to constitute detecting the initial presence of a flame. This voltage level subsequently decays to zero volts if another peak is not detected within a short space of time. Thus, in the event of a fire, the signal will constantly oscillate, producing many peaks over a short space of time, causing the output of the peak detection to remain relatively high.

This output from the peak detection is then fed to a microcontroller. If the input to the microcontroller remains high for a fixed amount of time (e.g. 5 seconds, tested at step 510), of sufficient time to be certain a flame is present, it will activate (step 512) the alert device, for example the piezoelectric buzzer alarm and LED lights 5. This can be considered to constitute detecting the definite presence of a flame. The microcontroller will also reassess the situation after a predetermined length of time (e.g. 10 seconds) to identify whether its input signal is still high. If it is, the alarm will remain on, but if it is not, the alarm will silence (step 513) and the microcontroller will again commence sensing for an input (with control returning to step 502).

Both embodiments may also include a temperature sensing fire detection method as a failsafe. A thermistor can be attached to the microcontroller in a potential divider configuration, which means that if the temperature rises above a fixed predetermined threshold, the alarm will be activated. Again, the reassessment of the temperature after a fixed period of time works in a similar way to the flame detection reset method described previously.

Both embodiments also include TEST switch 7, which is attached to and operated by the Test switch button 6, mounted on the outer casing. This switch configuration performs two roles. Firstly, if the alarm has not been activated, the button can be used to test the correct functioning of the product. When it is pressed in normal operation, the piezoelectric buzzer and LED lights 5 are turned on. They remain on for a predetermined period of time before they turn off. In one embodiment, this time is five seconds.

Also, the TEST switch acts as a silencer for the embodiments. If the alarm is activated, it can be temporarily silenced by pushing the TEST button. After a certain period of time, the microcontroller will reassess the situation in the same way as the reset method, and, if the danger is still present, will reactivate the alarm.

The sensor 4 is preferably directional, that is, limited to an arc or sensing. The sensing arc may be up to 90 degrees, or less, for example up to 45 degrees. This enables the sensor to be directed towards a particular location or position, where the risk of fire may be high.

The detector is particularly useful in a kitchen environment, but also finds utility in industrial and commercial premises.

It will be understood that variations may be made in the foregoing without departing from the scope of the claims. For example, the elements and teachings of the various illustrative embodiments may be combined in whole or in part in some or all of the illustrative embodiments. In addition, one or more of the elements and teachings of the various illustrative embodiments may be omitted, at least in part, and/or combined, at least in part, with one or more of the other elements and teachings of the various illustrative embodiments within the scope of the claims.

The invention claimed is:

1. A fire detector including:
   a sensor (4) for, in use, detecting electromagnetic radiation emitted by a flame and generating an electronic signal corresponding to the detected electromagnetic radiation; and
   a processing device (2) configured to select a portion of the electronic signal corresponding to a first time period and compare the selected signal portion with at least one parameter to determine an initial presence or absence of a flame, the processing device being further configured, upon determining the initial presence of the flame, to select a further portion of the electronic signal corresponding to a further time period and comparing the further selected signal portion with at least one parameter to determine a definite presence or absence of the flame.

2. A fire detector according to claim 1, further including an alert device (5) configured to output an alert upon receiving a signal from the processing device (2) indicative of determination of the definite presence of the flame.

3. A fire detector according to claim 1, wherein the processing device (2) is further configured to analyse the electronic signal to classify the flame as a particular type.

4. A fire detector according to claim 3, wherein the processing device (2) classifies the flame as controlled or uncontrolled.

5. A fire detector according to claim 4, wherein the processing device (2) is configured to analyse (312) the amplitude of oscillations of the selected signal portion at at least one frequency and wherein the at least one parameter corresponds to an oscillation threshold value, the processing device comparing the amplitude of oscillations and the oscillation threshold value to determine the initial presence or absence of the flame.

6. A fire detector according to claim 5, wherein the processing device (2) is configured to analyse (312) the amplitude of oscillations at 4 Hz and the oscillation threshold value is 35.

7. A fire detector according to claim 5, wherein if the processing device (2) does not determine the initial presence of the flame then the processing device returns (313) to selecting a portion of the electronic signal corresponding to a first time period.

8. A fire detector according to claim 5, wherein the processing device (2) is configured, upon determining the initial presence of the flame, to analyse the further selected signal portion to assess (314) whether amplitudes of oscillations of the further selected signal portion within a predetermined frequency range have values that within a predetermined range of ratios, wherein the flame is classified as an uncontrolled fire if the amplitudes are within the range, or the flame is classified as a controlled fire if the amplitudes are not within the range.

9. A fire detector according to claim 5, wherein the processing device (2) is configured, upon determining the initial presence of the flame, to analyse the further selected signal portion to assess (314) whether amplitudes of oscillations of the further selected signal portion within a predetermined frequency range are constant or decaying, wherein the flame is classified as an uncontrolled fire if the amplitudes are constant, or the flame is classified as a controlled fire if the amplitudes are decaying.

10. A fire detector according to claim 8, wherein if the flame is classified as a controlled fire then the processing device (2) returns to selecting a portion of the electronic signal corresponding to a first time period.

11. A fire detector according to claim 8, wherein the processing device is configured for assessing whether the amplitudes are within in the ratio range by:
    calculating (314A) a first ratio between amplitudes of oscillations at a first frequency and a second frequency within the predetermined frequency range;
    calculating (314B) a second ratio between amplitudes of oscillations at the first frequency and a third frequency within the predetermined frequency range; and
    determining (316, 318) if the first ratio and the second ratio meet criteria indicative of the ratio range of amplitudes.

12. A fire detector according to claim 11, wherein the first ratio is indicative of the constant amplitude (and uncontrolled fire) if it is 0.5 and the second ratio is indicative of the constant amplitude (and uncontrolled fire) if it is 0.175.

13. A fire detector according to claim 2, wherein the processing device (2) is configured to signal the presence of the continued fire to the alert device (5) only if the processing device determines the presence of the continued fire after the initial detection and an alert output by the alert device (5).

14. A fire detector according to claim 13, wherein if the processing device (2) is configured, upon determining that the uncontrolled type is no longer present, to stop signalling to the alert device and to restart sensing for the initial presence of a flame.

15. A fire detector according to claim 1, wherein a peak voltage associated with the selected signal portion is detected to determine (508) the initial presence of the flame, and the processing device (2) is configured to detect (510) a further peak voltage associated with the further selected signal portion to determine the definite presence of the flame.

16. A fire detector according to claim 15, wherein the processing device (2) is configured to detect (510) the further peak voltage after a predetermined period of time.

17. A fire detector according to claim 16, wherein the peak voltage associated with the selected signal portion decays if another peak is not detected within the predetermined period of time.

18. A fire detector according to claim 1, further including an amplifier for amplifying the electronic signal.

19. A fire detector according to claim 1, further including an optical filter device for filtering the radiation sensed by the sensor (4), the optical filter device being configured to filter out wavelengths outside a predetermined range of wavelengths.

20. A fire detector according to claim 1, further including a frequency filter device for filtering the electronic signal, the filter device configured to filter out frequencies outside a pre-determined range of frequencies.

21. A fire detector according to claim 2, wherein the alert device (5) comprises a visual and/or audible alarm.

22. A fire detector according to claim 21, wherein the audible alarm comprises a piezoelectric buzzer.

23. A fire detector according to claim 1, further including a temperature sensing device for monitoring temperature and activating the alert device (5) if the temperature rises above a predetermined temperature value.

24. A fire detector according to claim 23, wherein, if the processing device (2) determines the definite presence of a flame, then the temperature sensing device is controlled so as not to activate the alert device (5).

25. A fire detector according to claim 23, wherein the temperature sensing device comprises a thermistor.

26. A fire detector according to claim 1, wherein the sensor (2) has a unidirectional field of view, with a sensing arc of up to 90 degrees.

27. A fire detector as claimed in claim 26, wherein the sensing arc is up to 45 degrees.

28. A fire detector according to claim 1, wherein the sensor (2) comprises a pyroelectric sensor.

29. A fire detection system comprising a fire detector according to claim 1, the detector including a communications device for transferring a signal indicative of determination of the definite presence of the flame to a remote device including an alarm.

* * * * *

UNITED STATES PATENT AND TRADEMARK OFFICE
CERTIFICATE OF CORRECTION

| | | |
|---|---|---|
| PATENT NO. | : 8,890,696 B2 | Page 1 of 1 |
| APPLICATION NO. | : 13/700920 | |
| DATED | : November 18, 2014 | |
| INVENTOR(S) | : Popper | |

It is certified that error appears in the above-identified patent and that said Letters Patent is hereby corrected as shown below:

In The Claims

Column 8, line 43, please delete "in" after within.

Signed and Sealed this
Twenty-sixth Day of January, 2016

Michelle K. Lee
*Director of the United States Patent and Trademark Office*